United States Patent
Moisey et al.

(10) Patent No.: US 7,190,772 B2
(45) Date of Patent: Mar. 13, 2007

(54) METHODS AND SYSTEMS FOR AUTOMATICALLY AND ACCURATELY GENERATING CALL DETAIL RECORDS FOR CALLS ASSOCIATED WITH PORTED SUBSCRIBERS

(75) Inventors: Kenneth Andrew Moisey, Raleigh, NC (US); Peter Joseph Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 594 days.

(21) Appl. No.: 10/788,574

(22) Filed: Feb. 27, 2004

(65) Prior Publication Data

US 2005/0111640 A1 May 26, 2005

Related U.S. Application Data

(60) Provisional application No. 60/450,725, filed on Feb. 27, 2003.

(51) Int. Cl.
*H04M 15/00* (2006.01)
(52) U.S. Cl. .............. 379/114.27; 379/121.05; 379/126; 379/127.01
(58) Field of Classification Search ........... 379/111, 379/112.01, 114.01, 114.03, 114.14, 114.27, 379/114.28, 115.01, 116, 121.01, 121.05, 379/126, 127.01, 127.06
See application file for complete search history.

(56) References Cited

U.S. PATENT DOCUMENTS

| 5,699,416 | A | | 12/1997 | Atkins |
| 5,910,981 | A | * | 6/1999 | Bhagat et al. ............ 379/219 |
| 5,949,871 | A | * | 9/1999 | Kabay et al. ............ 379/229 |
| 6,028,914 | A | | 2/2000 | Lin et al. |
| 6,205,210 | B1 | | 3/2001 | Rainey et al. |
| 6,327,350 | B1 | | 12/2001 | Spangler et al. |
| 2001/0040957 | A1 | | 11/2001 | McCann et al. |

(Continued)

FOREIGN PATENT DOCUMENTS

EP 1 215 924 6/2002

(Continued)

OTHER PUBLICATIONS

Communication pursuant to Article 96(2) EPC corresponding to European application No. 04 715 799.5-2414 dated Sep. 18, 2006.

(Continued)

*Primary Examiner*—Binh K. Tieu
(74) *Attorney, Agent, or Firm*—Jenkins, Wilson, Taylor & Hunt, P.A.

(57) ABSTRACT

Methods and systems for generating accurate call detail records in networks that utilize number portability are disclosed. A number portability reconciliation (NPR) monitoring system receives signaling messages relating to different calls or transactions. The signaling messages may be copied from a network monitoring location upstream from where a number portability database lookup occurs for a call. The monitoring system automatically correlates messages relating to the same call or transaction into a call detail record usable by a plurality of different network monitoring applications. The NPR monitoring system determines whether number portability processing is required, and, in response, the NPR monitoring system queries a number portability database. The NPR monitoring system receives a response from the number portability database and updates the call detail record based on the response.

48 Claims, 5 Drawing Sheets

U.S. PATENT DOCUMENTS

| | | |
|---|---|---|
| 2003/0002639 A1 | 1/2003 | Huie |
| 2004/0042469 A1* | 3/2004 | Clark et al. .................. 370/401 |
| 2005/0152509 A1* | 7/2005 | Nelson et al. ........... 379/32.05 |

FOREIGN PATENT DOCUMENTS

| | | |
|---|---|---|
| EP | 1 215 924 A2 | 6/2002 |
| WO | WO-02/054786 | 7/2002 |
| WO | WO 02/054786 A1 | 7/2002 |

OTHER PUBLICATIONS

European Search Report corresponding to application No. 04715799.5-2414 dated May 12, 2006.

Notification of Transmittal of the International Search Report and the Written Opinion of the International Searching Authority, or the Declaration for International Application No. PCT/US04/06247 (Nov. 10, 2004).

* cited by examiner

FIG. 5

METHODS AND SYSTEMS FOR AUTOMATICALLY AND ACCURATELY GENERATING CALL DETAIL RECORDS FOR CALLS ASSOCIATED WITH PORTED SUBSCRIBERS

RELATED APPLICATIONS

This application claims the benefit of U.S. provisional patent application No. 60/450,725, filed Feb. 27, 2003, the disclosure of which is incorporated herein by reference in its entirety.

TECHNICAL FIELD

The present invention includes methods and systems for generating call detail records (CDRs). More particularly, the present invention relates to methods and systems for automatically and accurately generating CDRs for calls associated with ported subscribers.

RELATED ART

In the past, monitoring systems have been deployed in telecommunications networks to produce call detail record (CDR) information, which may in turn be used to support applications such as billing, billing verification, fraud detection, etc. A significant shortcoming with these systems involves the fact that within the telecommunications industry it is possible that number portability translation may occur at any point along the signaling pathway. While current industry standards recommend that number portability (NP) translation service should occur either prior to, or upon a signaling message reaching the "n–1" network (that is, the network that the signaling message traverses just prior to reaching the target or terminating network), this recommendation is not always followed by the collection of network operators that form a telecommunications network.

Consequently, in an NP environment, (wireline or wireless) systems that capture data and ultimately produce a CDR from signaling messages in the SS7 network can become limited in the information they produce depending on whether the called/calling party numbers lie within an NPA-NXX that has become portable. The limitations can become severe enough to reduce the value of existing data-mining-like reporting systems and/or necessitate that downstream systems, such as billing systems, obtain the necessary NP information by alternative arduous and costly means. That is, in a number portability environment, precisely where a call is monitored becomes a major factor with regard to the information that can be extracted or provided from the resultant CDR to a downstream system. More specifically, if a CDR is extracted prior to translation, the resultant CDR will only contain the dialed number and optionally the calling party number. As such, any subsequent processing may yield erroneous results if the dialed number has actually been ported to another service provider. Further, if the calling party number is itself a ported number, jurisdiction (geographical, rating, etc.) may also be misreported in any subsequent processing.

Figure 1:
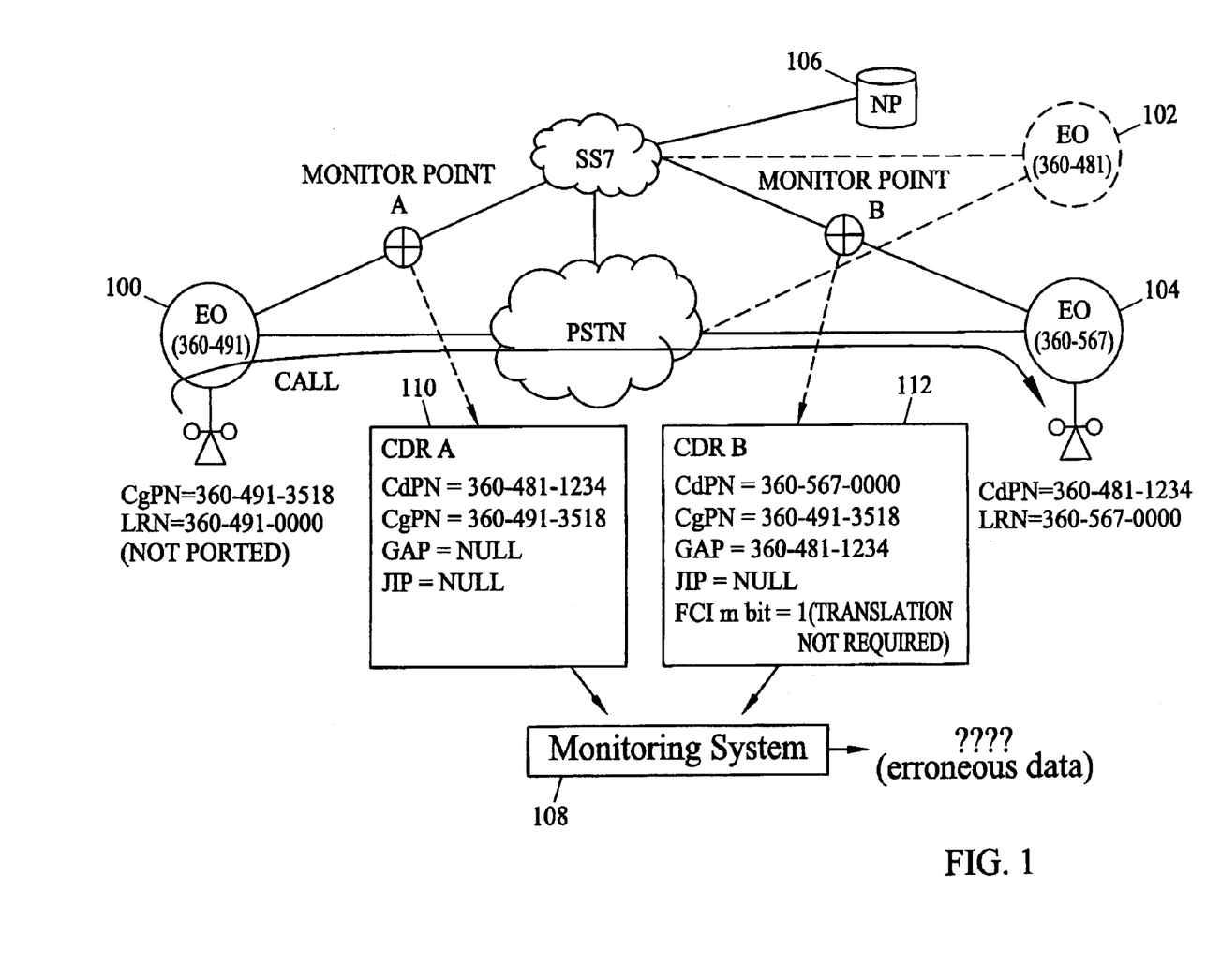
FIG. 1 is a network diagram illustrating an erroneous CDR created by conventional network monitoring systems.

FIG. 1 illustrates a monitoring scenario in an SS7 signaling network involving a call from a first subscriber to a second subscriber, where the second subscriber has been ported. In FIG. 1, a telecommunications network includes a first end office 100 associated with the calling party, a second end office 102 from which the called party number 360-481-1234 has been ported, and a third end office 104 to which the called party number has been ported. The telecommunications network may also include a number portability database 106 for storing routing numbers for ported numbers and a monitoring system 108 for monitoring call signaling messages and generating call detail records (CDRs). As illustrated in FIG. 1, if a network monitoring system 108 generates a CDR 110 based on data collected at monitor point A or any other point prior to the NP translation, the collected information would lead one to believe that the call destination was the 360-481 exchange. As such, any reports or billing records based on CDR 110 generated from data collected at monitor point A would be in error and have to be corrected by a downstream process.

If monitoring system 108 were to generate CDR 112 based on data collected at monitor point B, any ensuing reports or billing records based on CDR 112 will correctly reflect the actual call destination. However, if, as illustrated in FIG. 1, CDR 112 does not contain a jurisdiction information parameter (JIP), the actual point of call origination cannot be determined unless a local exchange routing guide (LERG) lookup is performed. Even if a LERG lookup is performed, this may not yield the originating switch if the call was from a ported number.

Because network monitoring systems may be limited in the locations where they can access signaling messages, CDR information may be incomplete or incorrect, as described above. For example, as illustrated in FIG. 1, if a CDR is collected at monitor point A, the CDR may lack the LRN associated with the exchange to which the called party number has been ported. Similarly, if a CDR is created based on data at monitor point B, the CDR may lack information corresponding to the correct originating exchange if the calling party number has been ported. Thus, limited network access can cause conventional network monitoring systems to produce erroneous or incomplete CDRs.

Those skilled in the art of number portability in an SS7 signaling network environment will appreciate that, following a number portability translation, the original called party dialed digits are typically moved within the ISDN user part (ISUP) call setup message from the called party address parameter to the generic address parameter (GAP), and a location routing number (LRN) associated with the terminating ported-to end office exchange is stored in the called party address parameter. Unlike the called party number methodology, the calling party number and the JIP are not transposed when the CgPN is ported. Rather, the originating switch should include JIP parameter with contents that are usually the NPA-NXX of the LRN associated with the originating switch along with the ported number in the CgPN parameter. However, in practice, this is not always done.

While some existing network monitoring systems may be capable of detecting whether a particular called party number or calling party number belongs to an NPA-NXX that is "portable," i.e., contains at least one NPA-NXX-XXXX that is or was ported, these systems cannot identify whether the actual number itself has been ported. As a result, these existing network monitoring systems are incapable of producing accurate CDRs when the called and/or calling party number has been ported.

U.S. patent application publication number US 2003/0002639 to Huie (hereinafter, "Huie") discloses a real time call validation system in which an originating carrier switch sends a special billability message to a central control server to determine billing relationships between carriers for collect and bill-to-third-party calls. The central control server then determines whether the dialed number has been ported by sending a TCAP query to an LNP database. If the called party dialed digits do not match the digits in the query response, the central control server determines that the called number has been ported. If the called number has been ported, the central control server sets an indicator in the response message to the originating carrier so that the carrier can determine whether to allow the call to be completed. Huie also discloses that "the carrier may insert an indicator or flag in the call detail record to indicate to the carrier's own billing program or that of its clearing house that the call needs to be invoiced to a carrier different from the carrier to which the dialed number's NPA-NXX belongs."

While Huie discloses using number portability information to determine how to properly bill for a call, the methods and systems disclosed therein for obtaining and using the number portability information are undesirable for a number of reasons. First, Huie requires that the originating switch initiate a special billability message to the central control server in order to obtain number portability information. Since call processing is suspended during the time that the originating switch waits for a response to the billability message, call setup time is increased. Second, Huie discloses that a query to the number portability database is required to determine whether the number has been ported. This means that some queries to the number portability database will occur for calls to non-ported numbers, which unnecessarily increases network traffic, increases the processing load on the node managing the number portability database, and further increases call setup time.

U.S. Pat. No. 5,699,416 to Atkins (hereinafter, "Atkins") discloses a system for querying an LNP database to obtain the correct line identification database for validation of an operator-assisted call billed to a ported directory number. Atkins, like Huie, requires suspension of call processing while number portability processing performed. In addition, Atkins states that the query to the number portability database is performed if a calling card is directory-number-based without regard to whether the particular directory number has been ported. These shortcomings of Atkins unnecessarily increase call setup time, signaling message traffic in the network, and the load on the number portability database.

Another fundamental shortcoming of the systems disclosed in Huie and Atkins is that both are narrowly tailored to billing validation systems. In Huie, the central call control server of the billing validation system performs the number portability database queries to determine whether or not to connect calls. In Atkins, the OSS performs the number portability database queries to determine whether which line information database to use to validate the calls. Performing number portability verification at a single special-purpose end system, such as a billing system, is inefficient because each end system that requires the information is required to perform its own number portability correction. This is inefficient and further increases the load on number portability databases.

Accordingly, there exists a need for improved methods and systems for automatically and accurately creating CDRs when the called and/or calling party number has been ported.

DISCLOSURE OF INVENTION

A number portability reconciliation (NPR) monitoring system of the present invention addresses industry-wide monitoring and billing problems by automatically querying an NP database for messages relating to calls to ported numbers using a number portability reconciliation monitoring system. In a preferred embodiment, the NPR monitoring system utilizes a TCP/IP connection between the monitoring system and a network NP database. Querying of the NP database may be accomplished using structured query language (SQL) or another functionally similar database access protocol. In an alternate implementation, the NPR monitoring system may utilize the SS7 transaction capabilities application part (TCAP) query and response protocol. The NPR monitoring system passively copies signaling messages relating to a plurality of different calls or transactions. By passively copying, it is meant that the NPR monitoring system copies signaling messages without otherwise affecting the progress of the call or transaction. The original signaling messages are allowed to proceed to their destinations. As a result, unlike the conventional systems described above, the present invention preferably does not delay call setup in performing number portability processing.

The NPR monitoring system correlates signaling messages that relate to the same call or transaction to produce a CDR including a superset of the message parameters required by downstream applications. The NPR monitoring system determines whether the call is directed to or from a ported directory number and queries the network number portability database using information contained in the CDR. The NPR monitoring system then incorporates information returned from the number portability database into the CDR. Because the CDR is updated based on a query to the number portability database, accuracy of the CDR is improved. In addition, because signaling messages are passively copied without requiring specialized billing validation queries, call processing is not adversely affected. Finally, because the CDR is a generic CDR containing a superset of parameters required by a plurality of different downstream applications, a single NP query can be used to generate an accurate CDR for many different applications.

Accordingly, it is an object of the invention to provide methods and systems for creating accurate CDRs when the called and/or calling party number has been ported.

It is another object of the invention to limit queries to number portability database for CDRs relating to calls in which the calling or called party number has been ported.

It is yet another object of the invention to produce a number-portability-corrected CDR usable by a plurality of different downstream applications, even when the network monitoring system may have limited or no access to the network in which a number portability query is performed for a call.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be described with reference to the accompanying drawings of which.

DETAILED DESCRIPTION OF THE INVENTION

An NPR monitoring system of the present invention may include or have access to information that identifies the NPA-NXX exchanges that serve ported subscribers. As such, only those signaling messages associated with calls to or from a subscriber in a ported exchange may trigger an NP database query by the NPR monitoring system. Thus, rather than querying the number portability database for all calls, the present invention preferably only queries the number portability database for calls associated with a ported exchange. By selectively querying the number portability database for numbers associated with ported subscribers, the present invention reduces unnecessary signaling and hits to the number portability database.

Furthermore, an NPR monitoring system may be configured to perform an NP database query in response to receiving certain types of call signaling messages. For example, an NP database query may be automatically triggered in response to receiving an ISDN user part (ISUP) initial address message (IAM) associated with a particular call, but not in response to receiving any subsequent signaling messages associated with the same call. As such, an NPR monitoring system of the present invention may perform a single NP database query for each CDR produced. Because the query may be performed automatically in response to receiving a particular call setup message, the need for specialized queries to initiate number portability processing is reduced.

In one exemplary implementation, the number portability database query may be performed after receiving one message to be included in a CDR, such as the IAM message, but prior to receiving all of the messages to be included in the CDR. In an alternate implementation, the NP database query may be performed after receiving all of the messages to be included in the CDR.

An NPR monitoring system of the present invention may examine information contained within a received call signaling message that indicates whether a number portability translation is required or has already been performed. For example, an ISUP IAM message contains a 2-byte parameter known as the forward call indicator (FCI). The FCI parameter includes many 1-or 2-bit indicators that are designated by alphanumeric characters. For example, the m bit of the FCI parameter indicates whether or not a number portability translation has been performed. In the event that a received ISUP IAM message includes a ported CdPN and an FCI m bit value of zero indicating that a number portability database lookup has not already been performed, the NPR monitoring system may query an NP database in order to determine the LRN of the end office serving the ported called party. If, however, the FCI m bit indicates that a number portability database query has already been performed, the NPR monitoring system of the present invention preferably does not query the number portability database, thereby further reducing unnecessary signaling and hits to the number portability database. In addition, in networks where non-standard number portability indicators are used to determine whether number portability lookup has been performed, the NPR monitoring system may analyze these parameters to determine whether to perform the NP database lookup. Examples of non-standard number portability status indicators that may be used to indicate whether a number portability lookup has been performed include the nature of address (NOA) parameter and the number portability forward information (NPFI) parameter. Using any parameter used by a network operator to determine whether a number portability database lookup has already been performed is intended to be within the scope of the invention.

If the NP database contains service provider identifier (SPID) information, the SPID associated with the ported called and/or calling party may also be obtained by the NPR monitoring system during the NP database query. The NPR monitoring system may incorporate the LRN and/or SPID information into a CDR associated with the call.

In the case of a call involving a ported calling party, as mentioned briefly above, an originating switch should, but does not always include a JIP parameter with contents that are usually the NPA-NXX of the LRN associated with the originating switch in one of the call setup messages. If no JIP parameter is specified by the originating switch, an NPR monitoring system of the present invention may determine the appropriate NPA-NXX of the LRN associated with the originating switch by querying the number portability database using the calling party number and incorporate this value into a JIP parameter associated with the CDR.

As such, an NPR monitoring system of the present invention may provide network operators with a means to correctly identify the origination and termination of calls placed within and through their networks, enable billing records to be created that are complete (i.e., that include the required number portability elements), and monitor and report on NP activity. Furthermore, because the NPR monitoring system performs NP database queries, it no longer matters where the data used to create the CDR is captured, as the NPR system can look up any necessary information that may be missing.

An NPR monitoring system of the present invention may also be used in network environments that employ signaling protocols other than or in addition to SS7. For example, Internet protocol (IP) telecommunication services may employ session initiation protocol (SIP), H.323 protocols (e.g., H.225, H.245, etc.) for call signaling operations. These signaling protocols, and consequently their associated number portability databases may utilize different called and calling party identifier formats other than conventional 10-digit telephone numbers. For example, in IP telephony environments, callers may be identified by electronic mail addresses, uniform resource locators, etc. However, the basic principles of NPR monitoring system operation apply to networks that utilize such signaling protocols. That is, a sequence of related signaling messages is captured, a call detail record is produced, a subscriber portability database is queried, and the returned service portability information is incorporated within the call detail record. The call detail record may be specific to a particular signaling protocol or independent of the type of signaling protocol used to establish the call or conduct the transaction. The corrected call detail record may then be provided to downstream applications, such as billing applications, billing verification applications, fraud detection applications, quality of service applications, etc.

By querying a number portability database if a CDR includes called or called party numbers that have been ported, the present invention allows network monitoring to be performed accurately from a single location in the network. The single location in the network can be a particular leg of a call before a number portability translation has been performed. The network monitoring may be performed at any location at which call setup messages can be captured, even including locations upstream from the network where a number portability database lookup occurs for a call. Thus, the present invention allows accurate CDRs to be created, even when there is no access to the service provider's network in which a number portability database lookup is performed.

Figure 2:
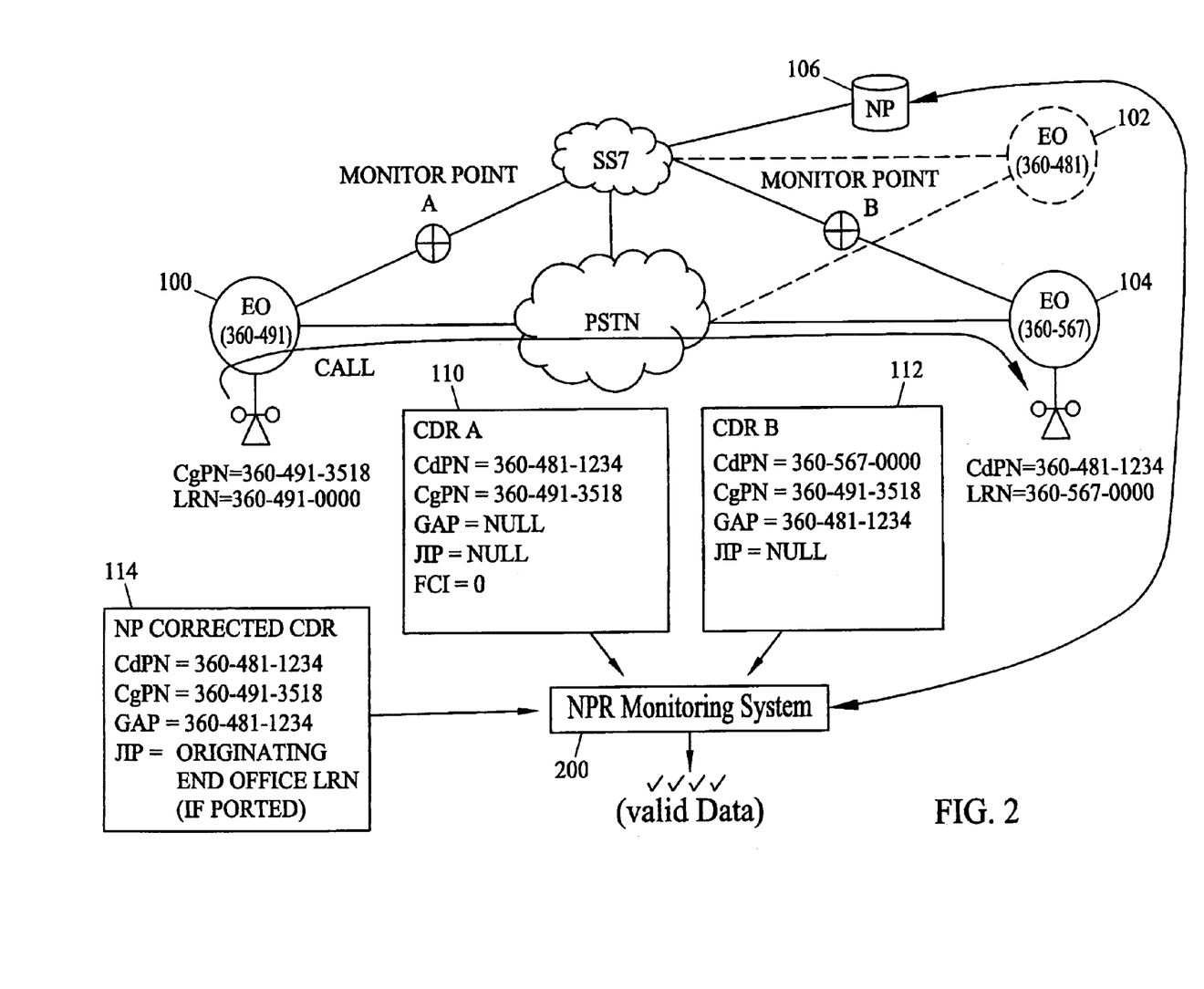
FIG. 2 is a network diagram illustrating a number portability reconciliation monitoring system according to an embodiment of the present invention.

FIG. 2 is a network diagram illustrating a network including an NPR monitoring system according to an embodiment of the present invention. Referring to FIG. 2, the network includes calling party end office 100, end office 102 from which the called party number 360-481-1234 has been ported, end office 104 to which the called party number has been ported, and number portability database 106. Number portability database 106 may be a local number portability database containing number portability information for wireline subscribers, a mobile number portability database containing number portability information for mobile subscribers, or a combined local/mobile number portability database containing number portability data for wireline and mobile subscribers. In addition, the network illustrated in FIG. 2 includes NPR monitoring system 200 for reconciling number portability data according to an embodiment of the present invention.

In FIG. 2, NPR monitoring system 200 may generate an accurate number portability corrected CDR 114, regardless of whether NPR monitoring system 200 has access to CDR data at monitor point A or monitor B. For example, if NPR monitoring system receives CDR 110 generated by monitoring the network from monitor point A, NPR monitoring system 200 would query number portability database 106 to obtain the LRN corresponding to end office 104. Similarly, if NPR monitoring system has access to CDR 112 at monitor point B, NPR monitoring system 112 may query number portability database 106 to determine the LRN corresponding to the end office from which the calling party number was ported. This information may likewise be incorporated into number portability corrected CDR 114. Thus, using an NPR monitoring system as illustrated in FIG. 2, accurate CDRs can be created, even when the locations from which a network can be monitored to create CDRs are limited.

NPR CDR Processing

Figure 3:
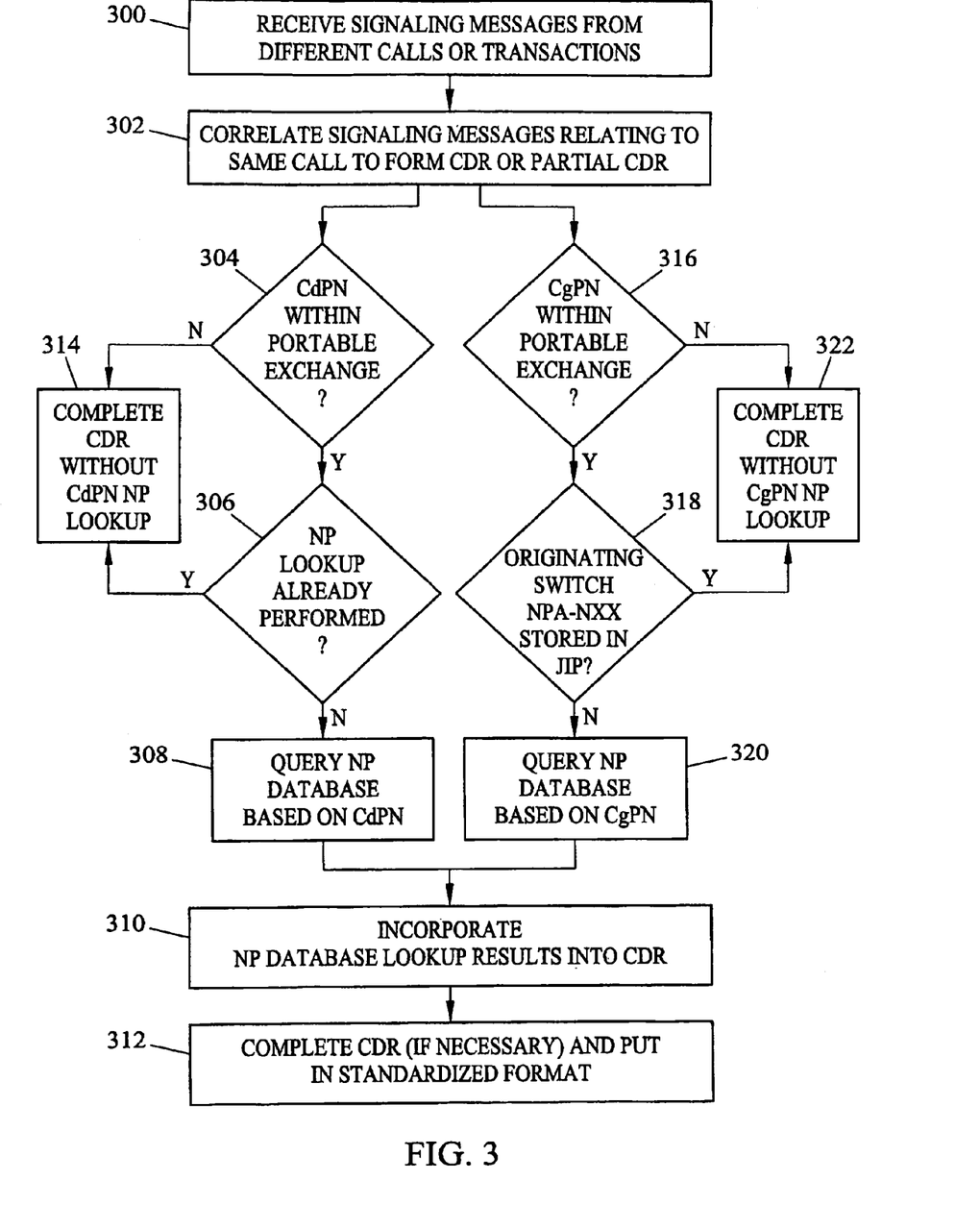
FIG. 3 is a flow chart illustrating exemplary processing that may be performed by a number portability reconciliation monitoring system according to an embodiment of the present invention.

FIG. 3 is a process flow diagram illustrating CDR generation and related NP processing by NPR monitoring system 200. Referring to FIG. 3, in step 300, NPR monitoring system 200 receives signaling messages from different calls or transactions. In step 302, NPR monitoring system 200 correlates signaling messages relating to the same call to form a CDR or a partial CDR. NPR monitoring system 200 may generate a raw CDR, which refers to an unformatted CDR. The CDR may include a superset of parameters required by a plurality of different downstream applications.

In step 304, NPR monitoring system 200 determines whether the called party number in the CDR is associated with a portable exchange. If the exchange corresponding to the CdPN is determined to be portable, control proceeds to step 306 where the message may be examined to determine whether a number portability lookup has already been performed. This step may include examining the FCI m bit or non-standard number portability specifiers, such as the nature of address (NOA) indicator or the number portability forward information (NPFI) parameter. If the CdPN is in a portable exchange and an NP translation has not already been performed, control proceeds to step 308 where NPR monitoring system 200 queries NP database 106. If the number portability database lookup results in a hit indicating that CdPN is ported, control proceeds to step 310 where NPR monitoring system 200 incorporates the LRN and/or service provider identification (SPID) information returned by NP database 106 into the CDR. Once the number portability database results have been incorporated into the CDR, control proceeds to step 312 where the CDR is completed and put into a standardized format.

Returning to step 304, if the called party number is not within a ported exchange, control proceeds to step 314 where the CDR is completed without a number portability lookup. Similarly, in step 306, if a number portability lookup has already been performed, control proceeds to step 314 where the CDR is completed without performing a number portability lookup. Performing a number portability lookup only when necessary reduces the increase in traffic in the network caused by network monitoring. Such a reduction can be important in conserving bandwidth within a service provider's internal network.

Returning to step 302, it may also be desirable to determine whether a calling party number has been ported and to correct the calling party number in a CDR if the calling party number has been ported. Accordingly, in step 316, NPR monitoring system 200 determines whether the calling party number in the CDR being created is associated with a portable exchange. If the CDR is associated with a portable exchange, control proceeds to step 318 where NPR monitoring system determines whether the originating switch NPA-NXX is stored in the JIP parameter in received call signaling messages. If the JIP parameter includes the NPA-NXX of the originating switch, then there is no need to query the number portability database because the originating switch for the call is known. However, if the JIP parameter is null or the originating switch does not use the JIP parameter to exclusively for calls originating from ported numbers, control proceeds to step 320 where NPR monitoring system 200 queries number portability database 106 based on the calling party number.

Once the LRN corresponding to the originating switch has been determined, control proceeds to steps 310 and 312 where the number portability database lookup results are incorporated in the CDR and the CDR is completed, as described above.

Returning to step 316, if the calling party is not within a portable exchange, control proceeds to step 322 where the CDR is completed without performing a number portability lookup. Similarly, if the originating switch NPA-NXX is stored in the JIP parameter, control proceeds to step 320 where the CDR is completed without performing a number portability database lookup. Thus, steps 316, 318, and 322 conserve bandwidth in a service provider's internal network in a manner similar to steps 304, 306, and 314.

Although the steps illustrated in FIG. 1 suggest separate number portability database lookups for calling and called party numbers, the present invention is not limited to performing separate number portability database lookups for calling and called party numbers. In a preferred embodiment of the invention, NPR monitoring system 200 may formulate a single number portability database query that requests routing numbers for both called and calling party numbers in the CDR. For example, if NPR monitoring system 200 determines that both the calling and called party numbers are within portable exchanges, the number portability lookup for the called party number has not been performed, and the originating switch NPA-NXX is not stored in the JIP, NPR monitoring system 200 may request the ported-from NPA-NXXs for both the called and calling party numbers in a single number portability database query. If a number portability lookup has already been performed for the called party number, the calling party number is within a portable exchange and the originating switch identifier is not stored in the JIP, NPR monitoring system 200 may formulate a number portability database query for the calling party number only. Similarly, if the called party number is within a portable exchange, a number portability lookup has not been performed for the called party number, and the calling party number is either not within a portable exchange or the originating end office identifier is stored in the JIP, NPR monitoring system 200 may formulate a number portability database query for the called party number only. Thus, by intelligently combining number portability queries for calling and called party numbers, an NPR monitoring system of the present invention further conserves bandwidth in a service provider's network. In addition, number portability database resources are also conserved by limiting the number of number portability database queries.

In addition to obtaining routing numbers from a number portability database lookup, NPR monitoring system 200 may also obtain service provider identification information from the number portability database. This service provider identification information may be incorporated into CDRs and used to generate billing information.

Once NP related processing is complete, additional processing may be performed by an NPR monitoring system 200. For example, CDRs produced by an NPR system may be provided as input to any number of network applications including usage measurements applications, billing applications, billing verification applications, fraud detection applications, usage measurement applications, etc.

NPR Monitoring System Architecture

Figure 4:
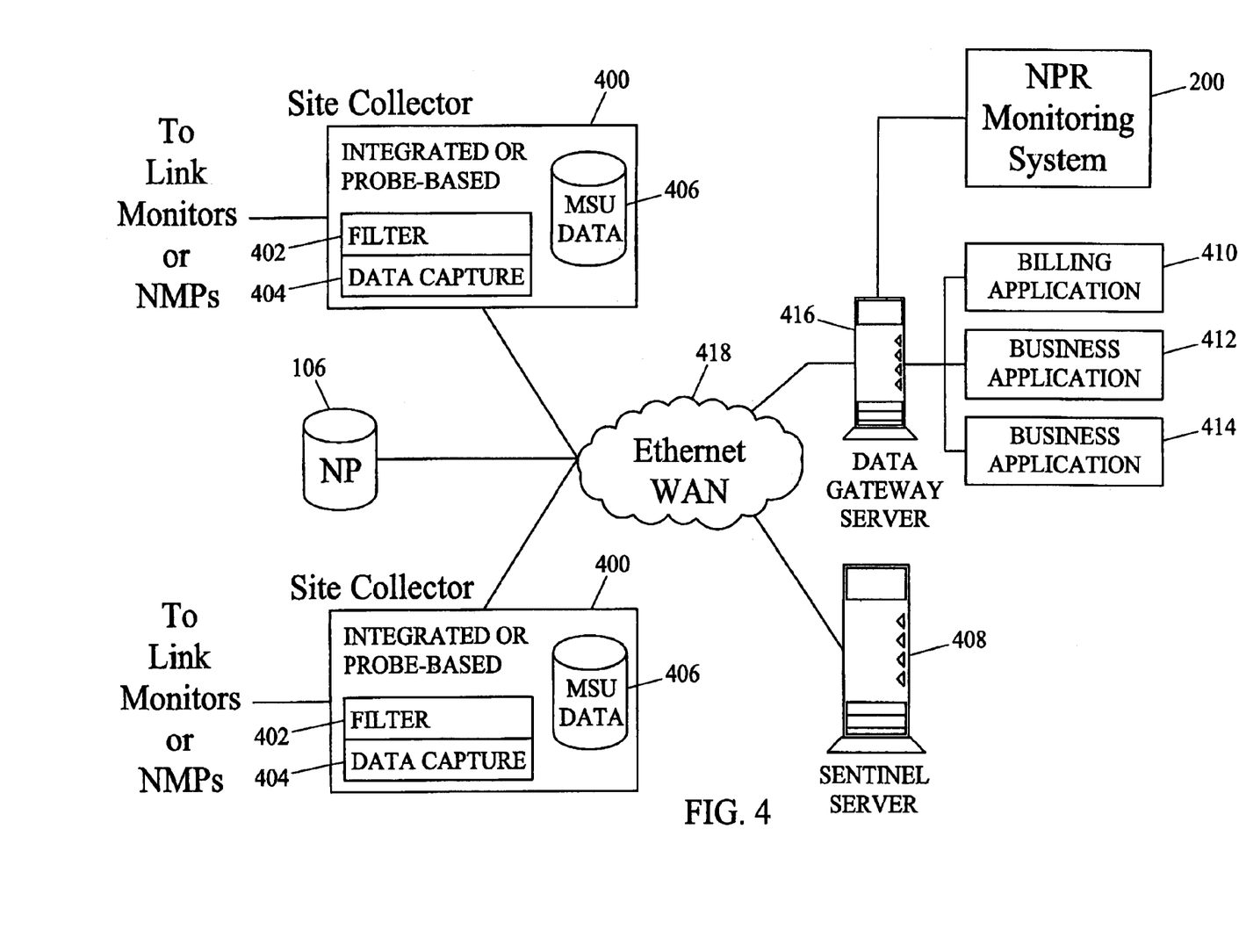
FIG. 4 is a network diagram illustrating an exemplary system architecture for a number portability reconciliation monitoring system according to an embodiment of the present invention.
Figure 5:
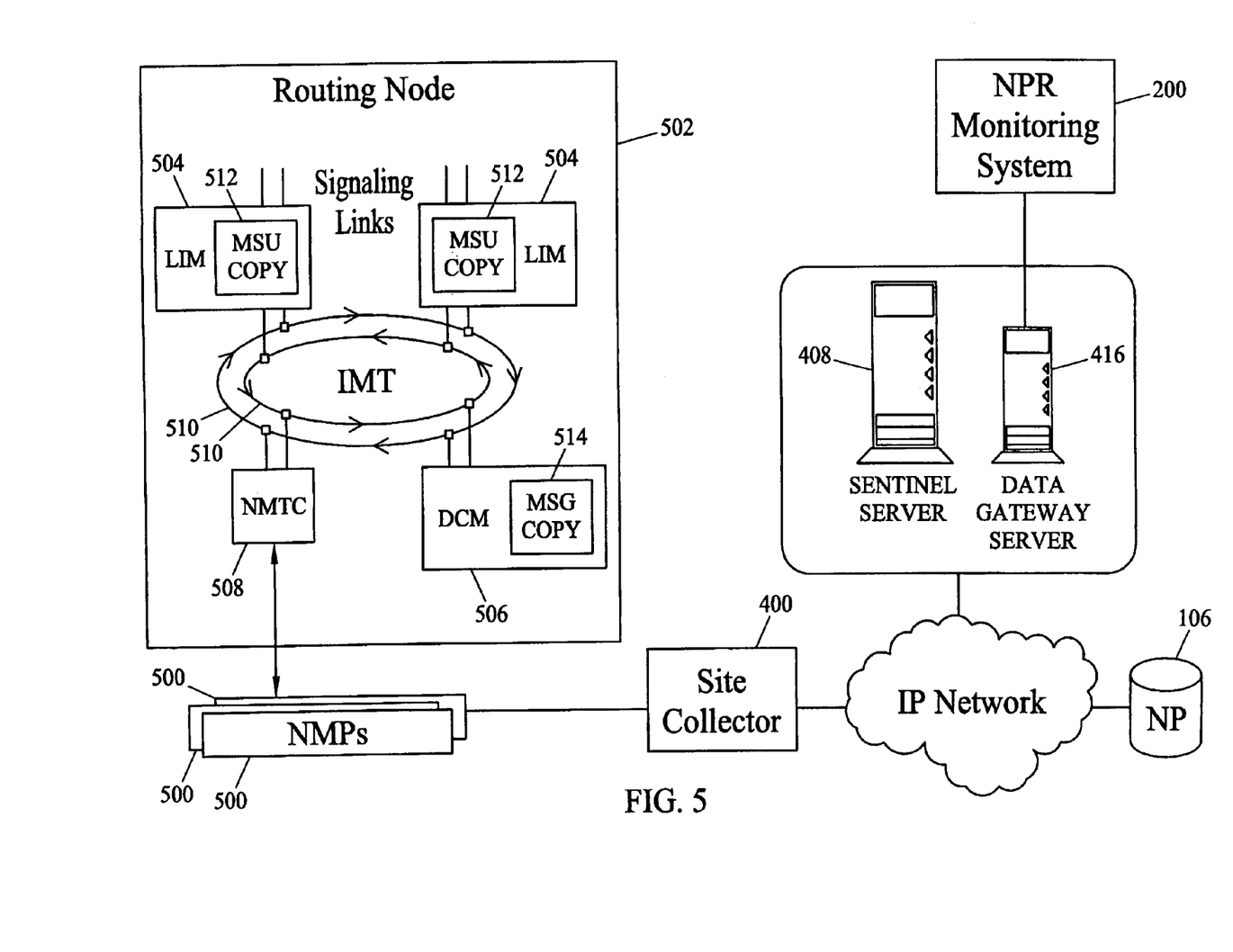
FIG. 5 is a network diagram illustrating a probeless network monitoring system architecture suitable for use with a number portability reconciliation monitoring system according to an embodiment of the present invention.

FIGS. 4 and 5 illustrate exemplary NPR monitoring system architectures based on the Sentinel™ platform available from Tekelec of Calabasas, Calif. FIG. 4 illustrates a generic NPR system architecture that collects signaling information from either discrete communication link probes or from an integrated signal transfer point/signaling gateway message copying interface. In FIG. 4, a pair of site collectors 400 collect and temporarily buffer monitored signaling messages. Site collectors 400 may be connected to external signaling link probes that passively copy signaling messages from SS7 signaling links or to network monitoring processors (NMPs) that receive and store signaling messages copied from signaling links within a routing node, such as an STP.

Each site collector 400 may be a general purpose computing platform including a microprocessor and one or more applications executing thereon. In the illustrated example, each site collector includes a filter application 402, a data capture application 404, and an MSU database 406. Filter application 402 filters received signaling messages based on filter criteria received from a Sentinel™ server 408. The filter criteria are preferably structured that the data captured by site collectors 400 is the superset of ,data required by billing application 410 and other business applications 412 and 414 resident on data gateway server 416. That is, each site collector 400 may send a non-redundant stream of MSU data across Ethernet WAN 418 to data gateway server 416. Sending a non-redundant stream of MSU data conserves bandwidth in service provider's internal network.

Data capture applications 404 capture raw MSU data copied by the link monitors or NMPs. MSU databases 406 store MSUs captured by data capture application 404 and filtered by filter application 402.

Data gateway server 416 generates CDRs required by the various applications. In the illustrated example, data gateway server 416 includes NPR monitoring system 200 for performing number portability correction and reconciliation of CDRs, as described above. NPR monitoring system 200 may be implemented in hardware, software, firmware, or any combination thereof.

As stated above, NPR monitoring system 200 on DGS 416 may query NP database 106 for called and/or calling party numbers within portable exchanges. The NP query may be transmitted to the NP database and a response may be received from the NP database via an Ethernet WAN 418 connection, as illustrated in FIG. 4. Following NP correction of the CDR, DGS 416 formats and filters the CDRs (as necessary) and provides information to various associated network service applications, such as billing, billing verification, fraud detection, mass call detection, quality of service, etc. Because NPR monitoring system 200 creates a single number-portability-corrected CDR usable by a plurality of different downstream applications, the present invention provides increased versatility over current CDR generation systems, especially those that are narrowly tailored to work with billing validation systems.

FIG. 5 is a block diagram illustrating a network monitoring system in which NPR monitoring system 200 may be incorporated in more detail. In FIG. 5, site collector 400 is connected to network monitoring processors 500 which receive signaling messages copied from a routing node 502. In the illustrated example, routing node 502 comprises a signaling transfer point with a plurality of link interface modules 504, a data communications module 506, and a network monitoring transport card 508. Each module may include a printed circuit board with an application processor and a communications processor mounted thereon. Modules 504, 506, and 508 are connected to each other via a counter rotating dual ring bus 510. Link interface modules 504 send and receive SS7 signaling messages over SS7 signaling links and perform MTP3 routing functions. Link interface modules also include MSU copy functions 512 for copying SS7 signaling messages received over SS7 signaling links for network monitoring purposes. DCM 506 sends and receives signaling messages over IP signaling links. DCM 506 may also include a message copy function 514 copying signaling messages received over IP signaling links. For example, message copy function 514 may copy SS7 signaling messages sent over IP signaling links or IP telephony signaling messages sent over IP signaling links for network monitoring purposes.

Network monitoring transport card 508 communicates messages copied from signaling links to network monitoring processors 500. When a message copy function 512 or 514 copies signaling messages from a signaling link, the message copy function broadcasts a service request to network monitoring processors 500 via network monitoring transport card 508. In response to the service request, the network monitoring processor provisioned to service the particular copy function establishes a TCP/IP connection with the message copy function via network monitoring transport card 508. The message copy function then sends copied MSUs to the network monitoring processor over the TCP/IP connection. Network monitoring processors 500 store signaling message copies and forward the copies to site collector 400. Site collector 400 filters the messages and transmits the messages to data gateway server 416 as described above. NPR monitoring system 200 generates number-portability-corrected CDRs by querying number portability database 106.

Thus, the present invention is capable of producing accurate CDRs even when the called or calling party number has been ported. By querying the NP database before delivering the CDR to downstream systems, the present invention greatly increases the accuracy and efficiency of downstream system operation. Performing number portability correction for CDRs also allows network monitoring to be performed from a single location in the network, even before the location at which a number portability database query occurs. In addition, by producing a single number-portability-corrected CDR with parameters usable by multiple applications, the present invention provides increased versatility over conventional CDR generation systems. Finally, because the present invention preferably only queries the LNP database for numbers that are actually ported and for which a number portability translation has not already been performed, unnecessarily signaling is reduced.

What is claimed is:

1. A method for generating call detail records (CDRs) in a communications network environment that supports number portability, the method comprising:
   (a) passively copying a plurality of signaling messages relating to a plurality of different calls or transactions;
   (b) automatically correlating signaling messages that relate to the same call or transaction to produce a CDR usable by a plurality of different network data collection applications;
   (c) determining whether number portability processing is required for the CDR;
   (d) in response to determining that number portability processing is required for the CDR, querying a network number portability database using information contained in one of the received signaling messages;
   (e) incorporating information returned from the network number portability database into the CDR; and
   (f) delivering the CDR to a downstream system.

2. The method of claim 1 wherein passively copying a plurality of signaling messages includes passively copying ISDN user part (ISUP) messages from an SS7 signaling link.

3. The method of claim 1 wherein passively copying a plurality of signaling messages includes passively copying transaction capabilities application part (TCAP) messages from an SS7 signaling link.

4. The method of claim 1 wherein passively copying a plurality of signaling messages includes passively copying session initiation protocol (SIP) messages from an IP signaling link.

5. The method of claim 1 wherein passively copying a plurality of signaling messages includes passively copying H.225 messages from an IP signaling link.

6. The method of claim 1 wherein passively copying a plurality of signaling messages includes passively copying the signaling messages using a communication link probe.

7. The method of claim 1 wherein passively copying a plurality of signaling messages includes passively copying the signaling messages using a probeless network monitoring system.

8. The method of claim 1 wherein passively copying a plurality of signaling messages includes passively copying a plurality of signaling messages at a location in the communications network environment independently of where number portability lookups are performed.

9. The method of claim 1 wherein automatically correlating the message parameters into a CDR includes automatically correlating the messages into a CDR including a superset of the parameters required by the network data collection applications.

10. The method of claim 1 wherein determining whether number portability processing is required includes determining whether at least one of a calling party number and a called party number in one of the received signaling messages is within a portable exchange.

11. The method of claim 10 wherein determining whether number portability processing is required includes determining whether the signaling message includes a number portability status indicator indicating whether a number portability lookup for the called party number has already been performed.

12. The method of claim 10 wherein determining whether number portability processing is required includes determining whether the signaling message includes a JIP parameter corresponding to an originating switch for a ported calling party number.

13. The method of claim 10 wherein querying the number portability database includes querying the number portability database only in response to determining that at least one of the numbers is within a portable exchange.

14. The method of claim 1 wherein querying the network number portability database using information contained in one of the received signaling messages includes querying the network number portability database using a called party number.

15. The method of claim 1 wherein querying the network number portability database using information contained in one of the received signaling messages includes querying the network number portability database using a calling party number.

16. The method of claim 1 wherein querying the network number portability database using information contained in one of the received signaling messages includes querying the network number portability database using a called party electronic mail address.

17. The method of claim 1 wherein querying the network number portability database includes querying a local number portability (LNP) database.

18. The method of claim 1 wherein incorporating information returned from the network number portability database into the CDR includes incorporating a location routing number (LRN) into the CDR.

19. The method of claim 1 wherein incorporating information returned from the network number portability database into the CDR includes incorporating a service provider identifier (SPID) into the CDR.

20. The method of claim 1 wherein delivering the CDR to a downstream system includes delivering the CDR to at least one of a billing application, a billing verification application, a usage measurements application, and a fraud detection application.

21. A method for generating accurate call detail records based on call signaling messages collected from a single location in the network, the method comprising:
   (a) receiving signaling messages copied from a location in a first network and generating a CDR based on the signaling messages;
   (b) determining whether the CDR contains calling or called party information that requires a number portability translation; and (c) in response to determining that the called or called party information requires number portability translation, querying a number portability database and using information returned from the number portability database to complete the CDR.

22. The method of claim 21 wherein receiving signaling messages copied from a location in a first network includes receiving signaling messages copied from a location upstream from a location at which a number portability lookup is performed for a call.

23. The method of claim 21 wherein querying the number portability database includes, in response to determining that the called and calling party information requires a number portability translation, inserting the called and calling party information into a single query and forwarding the query to the number portability database.

24. The method of claim 21 wherein querying the number portability database includes, in response to determining that the calling party information requires a number portability translation, querying the number portability database using the calling party information.

25. The method of claim 21 wherein querying the number portability database includes, in response to determining that the called party information requires a number portability translation, querying the number portability database using called party information.

26. The method of claim 21 comprising, in response to determining that the called and calling party information in the CDRs do not require number portability translation, reconciling the CDRs without performing a number portability database query.

27. A method for generating call detail records (CDRs) in a communications network that supports number portability, the method comprising:
  (a) copying a plurality of signaling messages associated with a call or transaction;
  (b) correlating the signaling messages to produce a CDR for the call or transaction;
  (c) querying a network number portability database using information contained in one of the copied signaling messages; and
  (d) incorporating information returned from the network number portability database into the CDR, wherein performing steps (a)–(d) includes performing steps (a)–(d) without suspending the call or transaction.

28. The method of claim 27 wherein copying a plurality of signaling messages includes copying the signaling messages using a link probe coupled to a signaling link.

29. The method of claim 27 wherein copying a plurality of signaling messages includes copying the signaling messages using a message copy function internal to a signaling message routing node.

30. The method of claim 27 wherein copying the signaling messages includes copying the signaling messages at a monitoring location upstream from a location in which a number portability lookup occurs for the call or transaction.

31. A monitoring system for generating a call detail record (CDR) in a communications network environment that supports number portability, the system comprising:
  (a) means for passively copying a plurality of signaling messages relating to a plurality of different calls or transactions;
  (b) means for automatically correlating signaling messages from the plurality of signaling messages that relate to the same call or transaction into a CDR usable by a plurality of different network data collection applications;
  (c) a number portability reconciliation (NPR) monitoring system operatively associated with the means for correlating for determining whether number portability processing is required for the CDR, and, in response to determining that number portability processing is required, for querying a number portability database using information contained in one of the received signaling messages, and for updating the CDR using information obtained from the number portability database; and
  (d) means associated with the NPR system for delivering the CDR to a downstream application.

32. The monitoring system of claim 31 wherein the means for passively copying includes a plurality of communications link probes for monitoring signaling links external to a signaling node.

33. The monitoring system of claim 31 wherein the means for passively copying includes a probeless network monitoring system associated with a network routing node.

34. The network monitoring system of claim 31 wherein the means for automatically correlating is adapted to generate a CDR including a superset of message parameters required by the plurality of different applications.

35. The network monitoring system of claim 31 wherein the means for automatically correlating is adapted to correlate ISDN user part (ISUP) messages to form the CDR.

36. The network monitoring system of claim 31 wherein the means for automatically correlating is adapted to correlate transaction capabilities application part (TCAP) messages to form the CDR.

37. The network monitoring system of claim 31 wherein the means for automatically correlating is adapted to correlate IP telephony signaling messages to form the CDR.

38. The network monitoring system of claim 31 wherein the NPR monitoring system is adapted to query a local number portability database.

39. The network monitoring system of claim 31 wherein the NPR monitoring system is adapted to query a mobile number portability database.

40. The monitoring system of claim 31 wherein the NPR monitoring system is adapted to determine whether the calling or called party exchange is portable in determining whether number portability processing is required.

41. The network monitoring system of claim 40 wherein, in response to determining that the called party exchange is portable, the NPR monitoring system is adapted to examine a number portability status indicator in one of the received signaling messages to determine whether a number portability database lookup has already been performed for the called party number.

42. The network monitoring system of claim 41 wherein the NPR monitoring system is adapted to refrain from performing a number portability database lookup based on the called party number in response to determining that a number portability database lookup has already been performed for the called party number.

43. The network monitoring system of claim 40 wherein, in response to determining that the calling party exchange is portable, the NPR monitoring system is adapted to determine whether a JIP parameter corresponding to an originating end office is present in the message.

44. The network monitoring system of claim 43 wherein the NPR monitoring system is adapted to refrain from performing a number portability database lookup based on the calling party number in response to determining that a JIP parameter corresponding to an originating end office is present in the message.

45. The network monitoring system of claim 31 wherein, in response to determining that number portability processing is required, the NPR monitoring system is adapted to extract a location routing number from the number portability database and to update the CDR to include the location routing number.

46. The network monitoring system of claim 31 wherein, in response to determining that number portability processing is required, the NPR monitoring system is adapted to query the number portability database via an Internet protocol network.

47. The network monitoring system of claim 31 wherein, in response to determining that number portability processing is required, the NPR monitoring system is adapted to query the number portability database via an SS7 signaling network.

48. The network monitoring system of claim 31 wherein the means for delivering is adapted to deliver the CDR to at least one of a billing application, a billing verification application, and a fraud detection application.

* * * * *